(12) United States Patent
Kim

(10) Patent No.: US 6,930,286 B2
(45) Date of Patent: Aug. 16, 2005

(54) HEATING COOKER

(75) Inventor: Jong Gun Kim, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/921,974

(22) Filed: Aug. 20, 2004

(65) Prior Publication Data
US 2005/0121434 A1 Jun. 9, 2005

(30) Foreign Application Priority Data
Dec. 3, 2003 (KR) .................. 10-2003-0087203

(51) Int. Cl.[7] .......................... A47J 27/04; A21B 1/24
(52) U.S. Cl. ................. 219/401; 126/332; 126/20
(58) Field of Search ............... 219/401; 99/467; 126/20, 20.1, 20.2, 332, 333, 337 R

(56) References Cited

U.S. PATENT DOCUMENTS

| 1,337,122 | A | * | 4/1920 | Doak | ..................... | 99/345 |
|---|---|---|---|---|---|---|
| 4,810,856 | A | * | 3/1989 | Jovanovic | ................ | 219/401 |
| 6,101,925 | A | | 8/2000 | Hsu | | |

* cited by examiner

*Primary Examiner*—Joseph Pelham
(74) *Attorney, Agent, or Firm*—Staas & Halsey LLP

(57) ABSTRACT

A heating cooker capable of evenly supplying steam from a steam generator into a cooking cavity. The heating cooker includes a cooking cavity, a steam generator to supply steam into the cooking cavity, and food racks installed in the cooking cavity to support food thereon. Each of the food racks is fabricated with a pipe having a plurality of steam discharging holes so that the steam is fed into each of the food racks. Thus, the heating cooker allows the steam to be distributed through entire portions of the food racks to allow the steam to be evenly discharged into the cooking cavity.

29 Claims, 6 Drawing Sheets

HEATING COOKER

CROSS-REFERENCE TO RELATED APPLICATIONS

This application claims the benefit of Korean Patent Application No. 2003-87203, filed Dec. 3, 2003 in the Korean Intellectual Property Office, the disclosure of which is incorporated herein by reference.

BACKGROUND OF THE INVENTION

1. Field of the Invention

The present invention relates, in general, to heating cookers and, more particularly, to a heating cooker constructed to evenly distribute steam from a steam generator to a cooking cavity.

2. Description of the Related Art

Generally, heating cookers, such as an oven, are appliances to cook food using a heater. The heating cooker includes a cabinet which defines a cooking cavity therein. The heater is mounted to a wall of the cooking cavity to irradiate heat into the cooking cavity. A plurality of food racks are placed in the cooking cavity to provide a multi-level structure, with the food being placed on the food racks.

A method of cooking the food using the heating cooker is as follows. The food is placed on the food racks provided in the cooking cavity, and then the heater is turned on. Heat is then generated by the heater and irradiated onto the food to cook the food within a short period.

Among the conventional heating cookers, there is a heating cooker having a steam generator to supply steam to the cooking cavity. The steam generator supplies the steam to the cooking cavity to prevent moisture in the food from evaporating as a result of heat generated by the heater. The prevention of evaporation tends to maintain the quality of the food. The conventional heating cooker having the steam generator cooks the food using both the heat generated by the heater and the steam to reduce a cooking time. Further, among the conventional heating cookers, a heating cooker may include a steam generator without the heater. Here the heating cooker cooks the food by using only the steam.

The steam generator of the conventional heating cooker includes a steam generator, a steam supply pipe, and a steam discharger. The steam generator heats water to generate the steam. The steam supply pipe couples the steam generator to the cooking cavity to supply the steam from the steam generator to the cooking cavity. The steam discharger is mounted to a wall of the cooking cavity, and includes steam discharging holes to disperse the steam into the cooking cavity.

In the steam generator constructed as described above, the steam transmitted through the steam supply pipe to the steam discharger is discharged into the cooking cavity through the steam discharging holes of the steam discharger, to contact the food in the cooking cavity.

However, the conventional heating cooker has a problem in that the steam discharger is localized in an upper portion or a lower portion of the cooking cavity, and the steam tends to be concentrated in a portion of the cooking cavity adjacent to the steam discharger. The steam is therefore unevenly distributed to the food which may be far away from the steam discharger.

SUMMARY OF THE INVENTION

Accordingly, an aspect of the present invention provides a heating cooker, which is constructed to evenly disperse steam from a steam generator to a cooking cavity.

Additional and/or other aspects and advantages of the invention will be set forth in part in the description which follows and, in part, will be obvious from the description, or may be learned by practice of the invention.

The above and/or other aspects are achieved by a heating cooker, including a cooking cavity, a steam generator to supply steam into the cooking cavity, and a food rack installed in the cooking cavity to support food thereon. The food rack includes a pipe to supply the steam from the steam generator to the cooking cavity, with the pipe being provided with a plurality of steam discharging holes.

The above and/or other aspects are also achieved by a heating cooker, including a cooking cavity, a steam generator to supply steam into the cooking cavity, a food rack installed in the cooking cavity to support food thereon, and a rack support provided on an inner wall of the cooking cavity to support the food rack. The food rack and the rack support respectively include a pipe to supply the steam from the steam generator into the cooking cavity, and the pipe is provided with a plurality of steam discharging holes.

In an aspect of the invention, the food rack and the rack support are respectively entirely fabricated with the pipe.

In an aspect of the invention the food rack and the rack support communicate with each other to form a single steam passage.

In an aspect of the invention, the food rack and the rack support form an independent steam passage.

In an aspect of the invention, a plurality of branch pipes are connected to an outlet of the steam generator. The plurality of branch pipes include a first branch pipe coupled to the food rack, and a second branch pipe coupled to the rack support.

In an aspect of the invention, the food rack comprises a plurality of food racks which provide a multi-level structure. The plurality of food racks communicate with each other to form a single steam passage.

In an aspect of the invention, the food rack comprises a plurality of food racks which provide a multi-level structure. Each of the plurality of food racks form an independent steam passage. The first branch pipe comprises a plurality of first branch pipes to be respectively coupled to each of the food racks.

In an aspect of the invention, the rack support comprises a plurality of rack supports. The rack supports communicate with each other to form a single steam passage.

In an aspect of the invention, the rack support comprises a plurality of rack supports. Each of the plurality of rack supports form an independent steam passage, and the second branch pipe comprises a plurality of second branch pipes to be respectively coupled to each of the rack support.

In an aspect of the invention, each of the plurality of food racks have an adjustable vertical position in the cooking cavity.

In an aspect of the invention, the plurality of steam discharging holes discharge steam in different steam discharging directions.

In an aspect of the invention, the heating cooker further includes a heater to irradiate heat into the cooking cavity.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
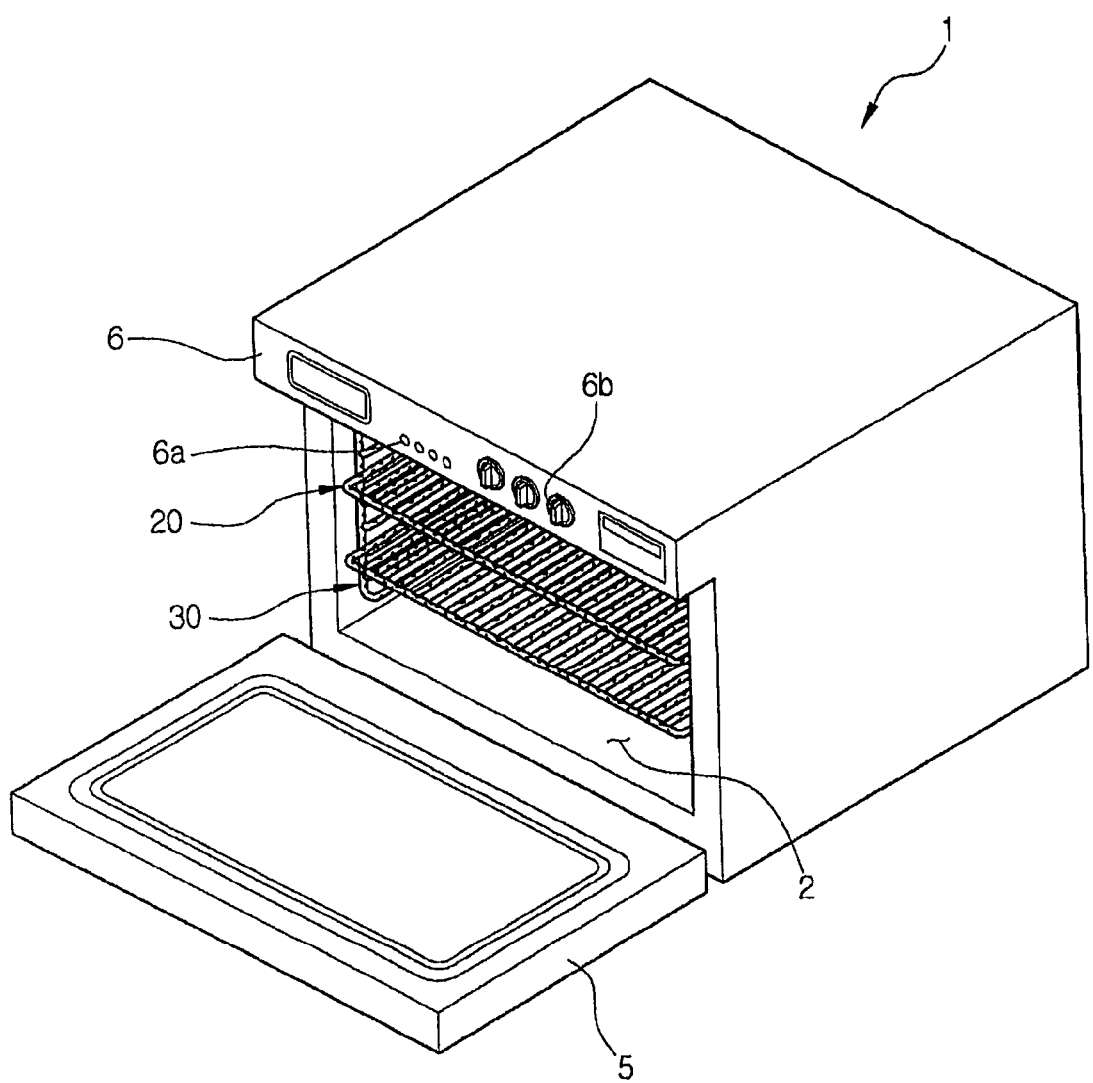
FIG. 1 is a perspective view of a heating cooker, according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
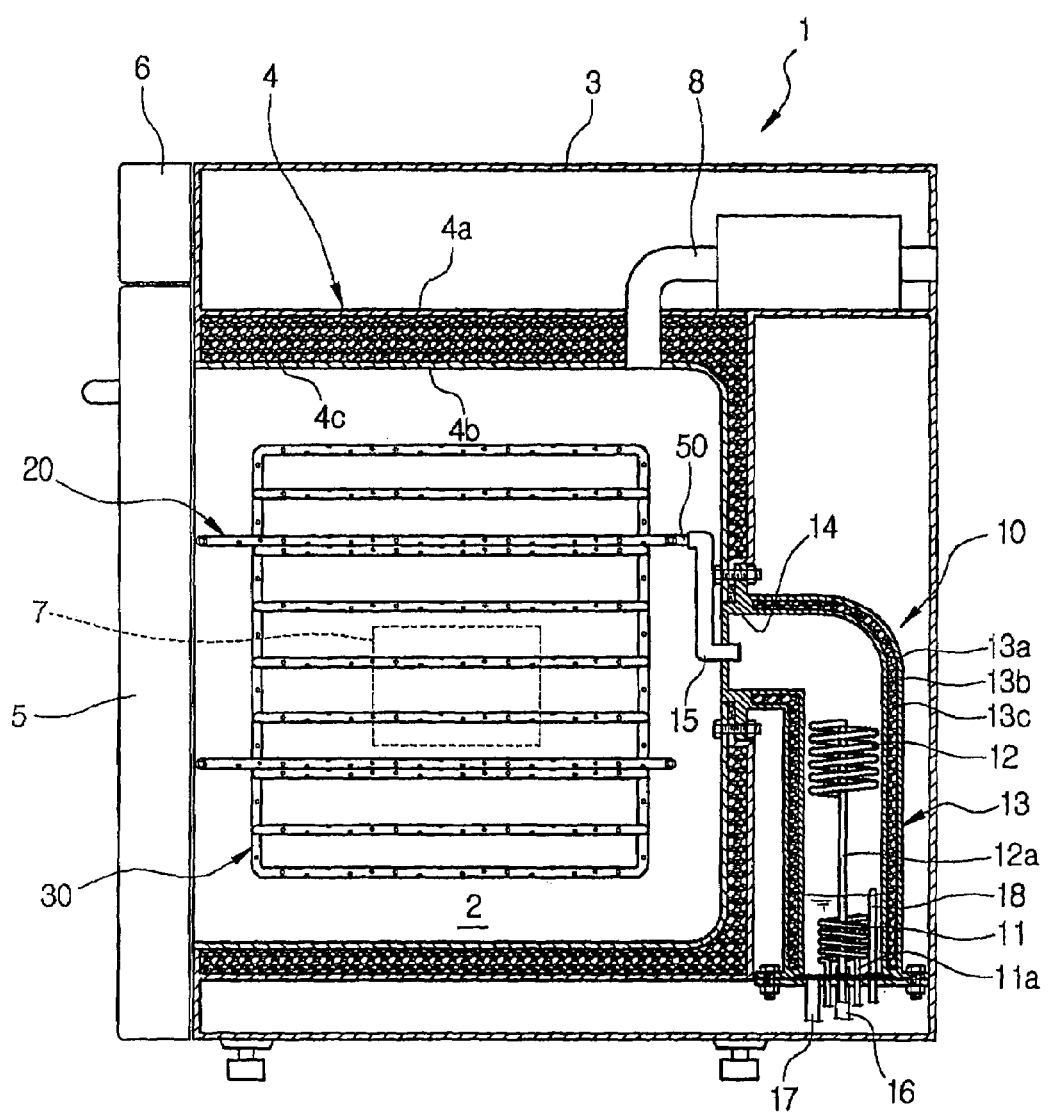
FIG. 2 is a sectional view of the heating cooker of FIG. 1.

As shown in FIGS. 1 and 2, a heating cooker according to the present invention includes a cabinet 1 which defines a cooking cavity 2 therein. The cabinet 1 includes an outer casing 3 to define an external appearance of the cabinet 1, and an inner casing 4 which is installed in the outer casing 3 to be spaced apart from the outer casing 3 to define the cooking cavity 2.

The cooking cavity 2 is open at a front thereof to allow a user to put food into and take out food out of cooking cavity 2. A door 5, which may be opened downward and closed upward, is attached to a front of the cabinet 1 to allow the user to open and close the cooking cavity 2. A control panel 6, which includes a plurality of control buttons 6a and control knobs 6b, is provided at a portion of the cabinet 1 above the door 5 to control an operation of the heating cooker.

A heater 7 is provided in each of opposite sidewalls of the cooking cavity 2 to irradiate heat into the cooking cavity 2. Further, a steam generator 10 is provided between the cooking cavity 2 and a rear wall of the cabinet 1 to supply steam to the cooking cavity 2.

Thus, the heating cooker of the present invention cooks the food placed in the cooking cavity 2, using both the heat generated by the heaters 7 and the steam generated by the steam generator 10. The heaters 7 and the steam generator 10 may be operated separately or simultaneously, in response to control signals output from the control panel 6. Further, the heating cooker may be provided with only the steam generator 10 and without the heaters 7. In this case, the heating cooker cooks the food using only the steam.

The inner casing 4 includes an outside casing part 4a and an inside casing part 4b. An insulating material 4c fills a space between the outside and inside casing parts 4a and 4b to insulate the cooking cavity 2 from an outside of the cooking cavity 2.

The steam generator 10 includes a steam generating vessel 13. A first heating member 11 is mounted to a lower portion in the steam generating vessel 13, and a second heating member 12 is mounted to an upper portion in the steam generating vessel 13. A predetermined amount of water is contained in the lower portion of the steam generating vessel 13 so that the first heating member 11 is completely immersed in the water. Thus, when the first heating member 11 is heated, the water contained in the steam generating vessel 13 is boiled to produce steam. The steam is heated again by the second heating member 12 which is mounted to the upper portion in the steam generating vessel 13. The second heating operation performed on the steam produces overheated steam which is useful in producing cooked foods of high quality.

An upper end of the steam generating vessel 13 is bent toward a rear wall of the inner casing 4. An outlet 14 is provided at a predetermined portion of the upper end of the steam generating vessel 13. The steam, which is heated again by the second heating member 12, is supplied to the cooking cavity 2 through the outlet 14. Further, a steam supply pipe 15 is mounted to an interior of a rear wall of the cooking cavity 2 and is connected to the outlet 14. Thus, the steam generated by the steam generator 10 is supplied through the steam supply pipe 15 to the cooking cavity 2.

The steam generating vessel 13 includes an inner vessel part 13a and an outer vessel part 13b. A shielding material 13c fills a space between the inner vessel part 13a and the outer vessel part 13b to intercept radiant heat. First and second terminals 11a and 12a, which are respectively provided at the first and second heaters 11 and 12, extend downward, and are supported by a lower end of the steam generating vessel 13. A feed pipe 16 and a drain pipe 17 are mounted to the lower end of the steam generating vessel 13. The feed pipe 16 is connected to an external water source to feed water into the steam generating vessel 13. The water is discharged through the drain pipe 17 to an outside of the steam generating vessel 13. Further, a water level sensor 18 is installed at a predetermined portion of the lower end of the steam generating vessel 13, and detects a level of water of the water generating vessel 13 to prevent the second heating member 12 from being immersed in the water which is fed into the steam generating vessel 13 through the feed pipe 16. A discharging duct 8 is provided on an upper portion of the cooking cavity 2 to discharge the steam used to heat food in the cooking cavity 2, to an outside of the cooking cavity 2.

A plurality of food racks 20 are installed in the cooking cavity 2 to provide a multi-level structure. Food is placed on the food racks 20. Rack supports 30 are mounted to left and right inner walls of the cooking cavity 2, respectively, to support the food racks 20. The food racks 20 and the rack supports 30 discharge steam, supplied through the steam supply pipe 15, into the cooking cavity 2, in addition to supporting the food. According to the present invention, the food racks 20 and the rack supports 30 allow the steam, supplied from the steam generator 10, to be more evenly discharged into the cooking cavity 2 through the food racks 20 and the rack supports 30. Further, the food racks 20 and the rack supports 30 are constructed to allow the steam to be discharged into the cooking cavity 2 without the use of an additional steam discharger.

Figure 3:
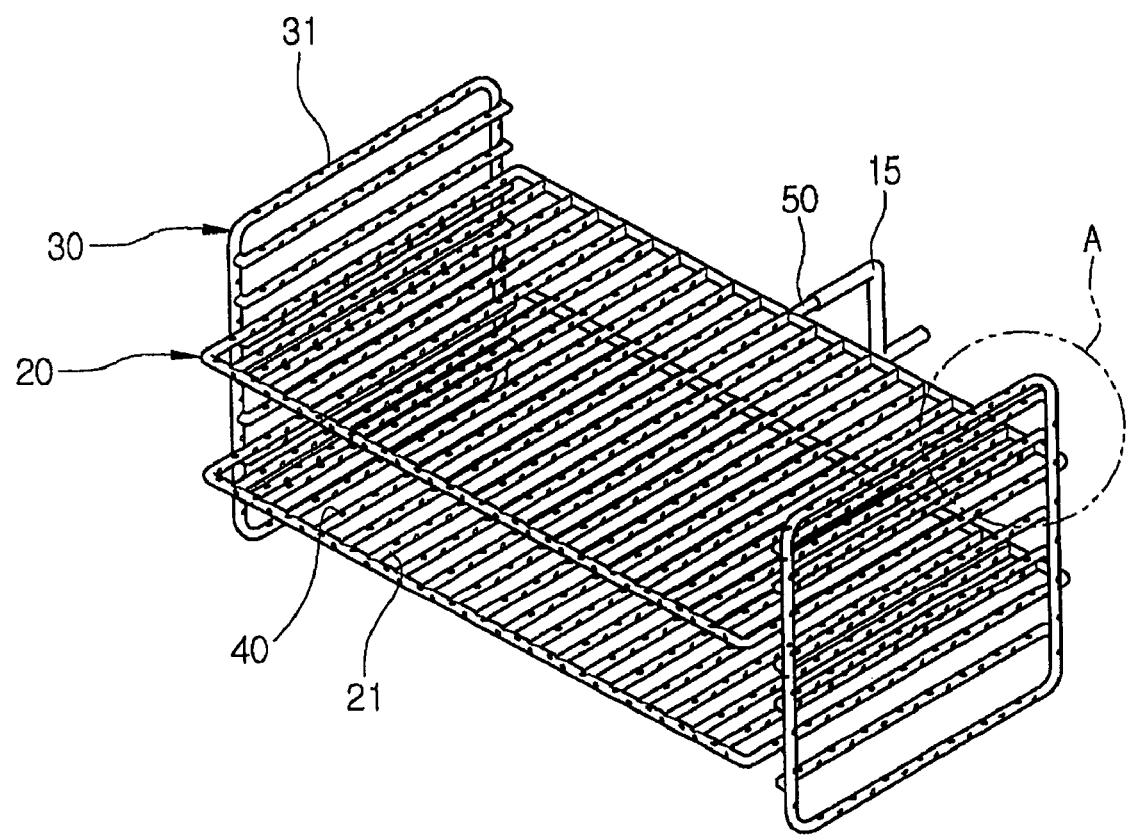
FIG. 3 is a perspective view of food racks and rack supports included in the heating cooker of FIG. 1.

Thus, as shown in FIG. 3, each of the food racks 20 includes hollow pipes 21 to supply the steam into the food racks 20, and each of the rack supports 30 includes hollow pipes 31 to supply the steam into the rack supports 30. Further, a plurality of steam discharging holes 40 are provided on the hollow pipes 21 and 31, respectively. Each of the food racks 20 is substantially entirely fabricated with the hollow pipes 21, and each of the rack supports 30 is entirely fabricated with the hollow pipes 31 to allow the steam to be more evenly discharged into the cooking cavity 2.

In a detailed description, each of the food racks 20 includes a plurality of pipes 21. The plurality of hollow pipes 21 are connected to each other and communicate with each other. The arrangement of the plurality of hollow pipes 21 forms a planar rack. Similarly, each of the rack supports 30 includes a plurality of pipes 31. The plurality of pipes 31 are connected to each other and communicate with each other. The arrangement of the plurality of pipes 31 forms a planar rack support. Additionally, each of the food racks 20 or each of the rack supports 30 may be formed by arranging one pipe in a zigzag manner, without being limited to the embodiment shown in the attached drawings.

Further, each of the food racks 20 is supported by left and right rack supports 30 mounted to left and right sides of the food racks 20, respectively, to communicate with the rack supports 30. The left and right rack supports 30 communicate with each other via the food racks 20. Thus, the food racks 20 and the left and right rack supports 30 are integrated with each other to form a single steam passage.

A steam injection pipe 50 is provided at a predetermined portion of an upper food rack 20. The steam injection pipe 50 extends outwardly from the upper food rack 20 to be connected to the steam supply pipe 15 which is mounted to the rear wall of the cooking cavity 2. When the steam injection pipe 50 is connected to the steam supply pipe 15, the steam passes through the steam supply pipe 15 and the steam injection pipe 50. The steam is then evenly discharged into the cooking cavity 2 through the food racks 20 and the rack supports 30.

According to various embodiments of the invention, the steam injection pipe 50, connected to the steam supply pipe 15, may be provided at positions other than the upper food rack 20. That is, the steam injection pipe 50 may be provided at a predetermined portion of a lower food rack 20 or the left or right rack support 30. In such cases, in which the steam injection pipe 50 is provided at the predetermined portion of the lower food rack 20 or the left or right rack support 30, the steam is still supplied to the food racks 20 and the rack supports 30. The food racks 20 and the rack supports 30, which are integrated with each other, are held in the cooking cavity 2, by connecting the steam injection pipe 50 to the steam supply pipe 15 which is mounted to an interior surface of the rear wall of the cooking cavity 2.

The food racks 20 and the rack supports 30 constructed as described above, allow the steam to be evenly distributed to the cooking cavity 2, through entire portions of the food racks 20 and the rack supports 30. Further, because the food racks 20 and the rack supports 30, constructed as described above, have a simple structure, the food racks 20 and the rack supports 30 are easily installed in the cooking cavity 2.

Figure 4:
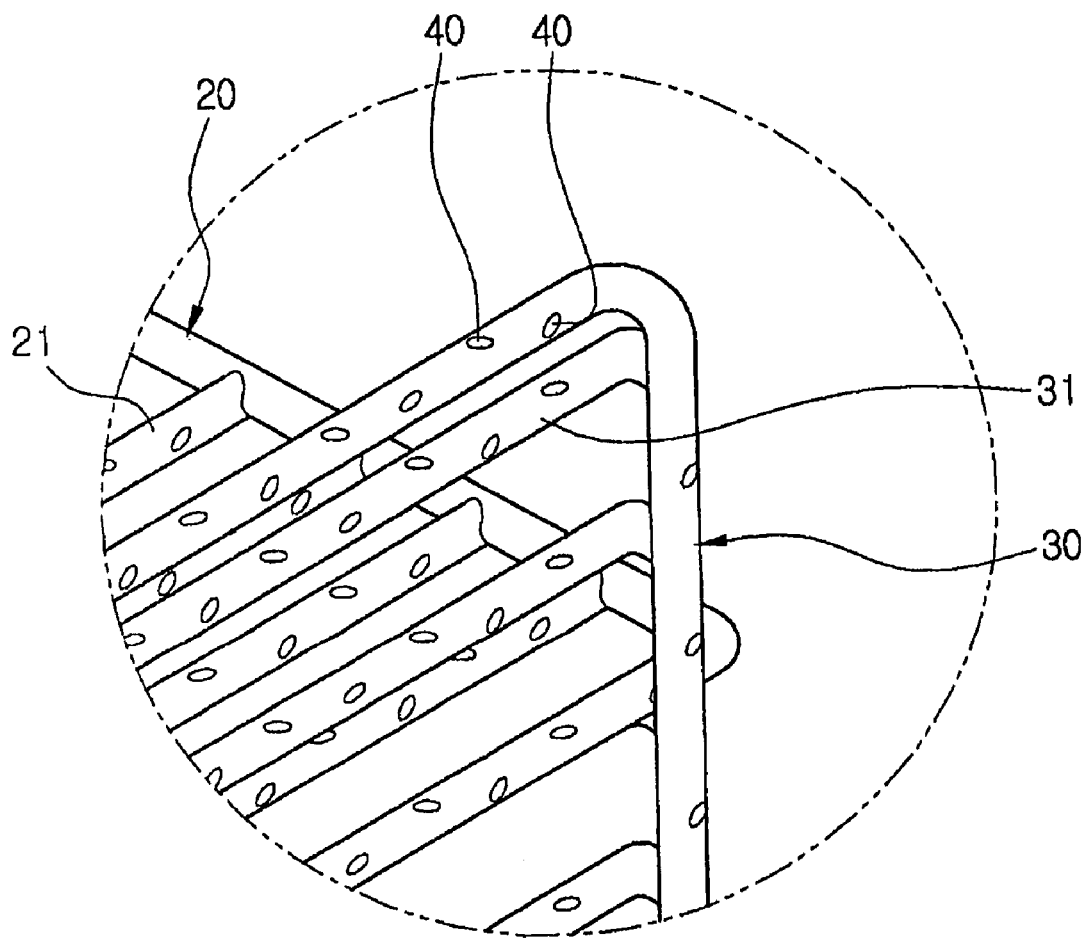
FIG. 4 is an enlarged perspective view of a portion "A" encircled in FIG. 3.

The plurality of steam discharging holes 40 are provided on the food racks 20 and the rack supports 30 so that the steam is distributed through the food racks 20 and the rack supports 30, simultaneously, in several directions. This is due to the fact that, as shown in FIG. 4, the plurality of steam discharging holes 40 point in a variety of steam discharging directions.

Because the steam discharging holes 40 point in a variety of steam discharging the steam contacts substantially every portion of an available surface of food placed on each of the food racks 20.

Regarding surfaces of food which directly contact surfaces of the food racks 20 and the food supports 30 at points without a steam discharging hole 40, the food at these surfaces, is indirectly cooked by ambient heat in the cooking cavity 2 and the heat which is transferred from the racks 20 and the food rack supports 30 themselves.

Figure 5:
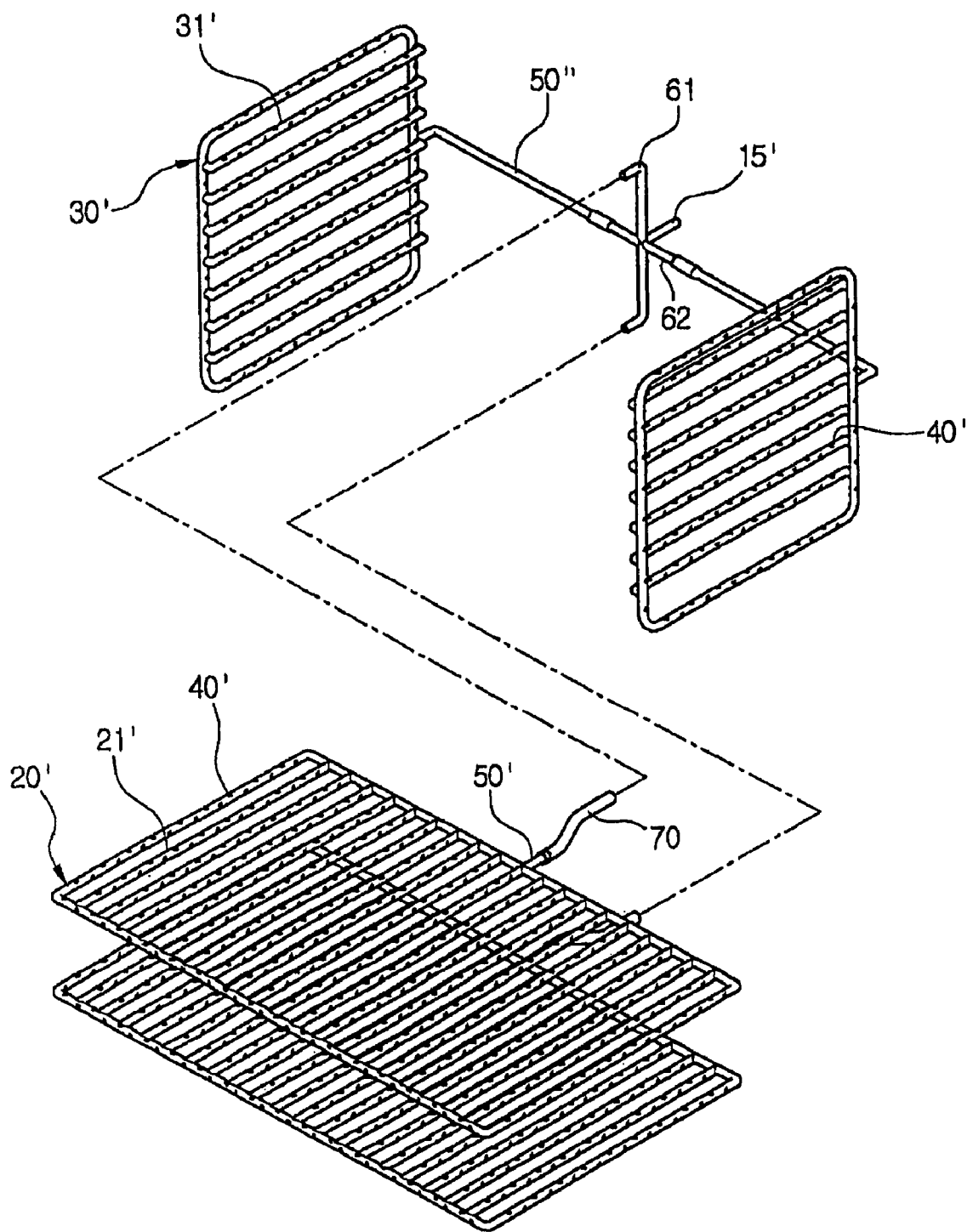
FIG. 5 is a perspective view of food racks and rack supports included in a heating cooker, according to a second embodiment of the present invention.

FIG. 5 shows food racks 20' and rack support units 30' included in a heating cooker, according to a second embodiment of the present invention.

As shown in FIG. 5, the heating cooker according to the second embodiment includes the food racks 20' and the rack supports 30' which do not communicate with each other so that each of the food racks 20' and each of the rack supports 30' form independent steam passages. The heating cooker also includes a steam supply pipe 15'. The steam supply pipe 15' branches into first and second branch pipes 61 and 62. In this case, the first branch pipes 61 are respectively connected to each of the food racks 20', and the second branch pipes 62 are respectively connected to each of the rack supports 30'. Such a construction allows the food racks 20' and the rack supports 30' to form several short independent steam passages, in place of a single long steam passage, to allow steam to be smoothly distributed through the food racks 20' and the rack supports 30'. According to this embodiment of the invention, the food racks 20' and the rack supports 30' simultaneously distribute the steam into the cooking cavity 2 through steam discharging holes 40' which are provided on the food racks 20' and the rack supports 30'.

To allow the steam to be smoothly distributed through the food racks 20', the food racks 20' comprise a plurality of food racks 20' in a multi-level structure. In this case, each of the plurality of food racks 20' forms an independent steam passage. The first branch pipes 61 comprise a plurality of branch pipes to correspond to a number of the food racks 20'. Each of the first branch pipes 61 is connected to an associated food rack 20'. Further, the rack supports 30' provided on left and right sides of the food racks 20' respectively form an independent steam passage. The second branch pipes 62 comprise a plurality of branch pipes to be connected to each of the rack supports 30'.

Of course, without being limited to the above-mentioned embodiment, the food racks 20' having the multi-level structure may be provided to communicate with each other to form a single steam passage. The rack supports 30' may be provided to communicate with each other, thus forming a single steam passage. Further, the rack supports 30' may be provided to form a single steam passage while each of the food racks 20' may be provided to form an independent steam passage. As such, the food racks and the rack supports may be designed in various arrangements and patterns, considering the desired length and shape of the steam passage and a desired flow of the steam.

A first steam injection pipe 50' extends outwardly from a predetermined portion of each of the food racks 20' to connect each of the food racks 20' to an associated first branch pipe 61. Further, a second steam injection pipe 50" outwardly extends from a predetermined portion of each of the rack supports 30' to connect each of the rack supports 30' to an associated second branch pipe 62. When each of the second branch pipes 62 is connected to the associated second steam injection pipe 50' of the rack supports 30', the rack supports 30' are held in the cooking cavity 2.

In this case, the food racks 20' may be provided to be spaced apart from the rack supports 30' without being integrated with the rack supports 30'. Each of the rack supports 30' may be constructed so that a plurality of pipes 31' are horizontally arranged in a space defined by a frame pipe 31' to form a frame of each of the rack supports 30'. Each of the pipes 31', which are arranged in the frame pipe 31', is inwardly projected from the frame pipe 31', to support left and right edges of each of the food racks 20'. Thus, each of the food racks 20' is placed on the pipes 31' of the rack supports 30' so that left and right edges of each of the food racks 20' are supported by the pipes 31' of the rack supports 30'. Each of the food racks 20' is held between the rack supports 30'.

Further, each of the food racks 20' is provided so that a vertical position thereof in the cooking cavity 2 is adjusted, according to a size of food placed on each of the food racks 20'. A connection pipe 70, made of a flexible material, is provided between the first steam injection pipe 50' of each of the food racks 20' and each of the first branch pipes 61. Thus, when each of the food racks 20' is connected to the associated first branch pipe 61 through the connection pipe 70, each of the food racks 20' is movable. Each of the food racks 20 may be placed on lower or upper pipes 31' of the rack supports 30'. In this way, the vertical position of each of the food racks 20 is adjustable.

Of course, the heating cooker according to the present invention may be constructed so that only the food racks 20' are installed in the cooking cavity 2 without the rack supports 30'. In this case, steam is discharged into the cooking cavity 2 through only the food racks 20'. Further, when support members are provided along inner surfaces of opposite sidewalls of the cooking cavity 2 to support opposite edges of the food racks 20', a vertical position of each of the food racks 20' is adjustable using the support members.

Figure 6:
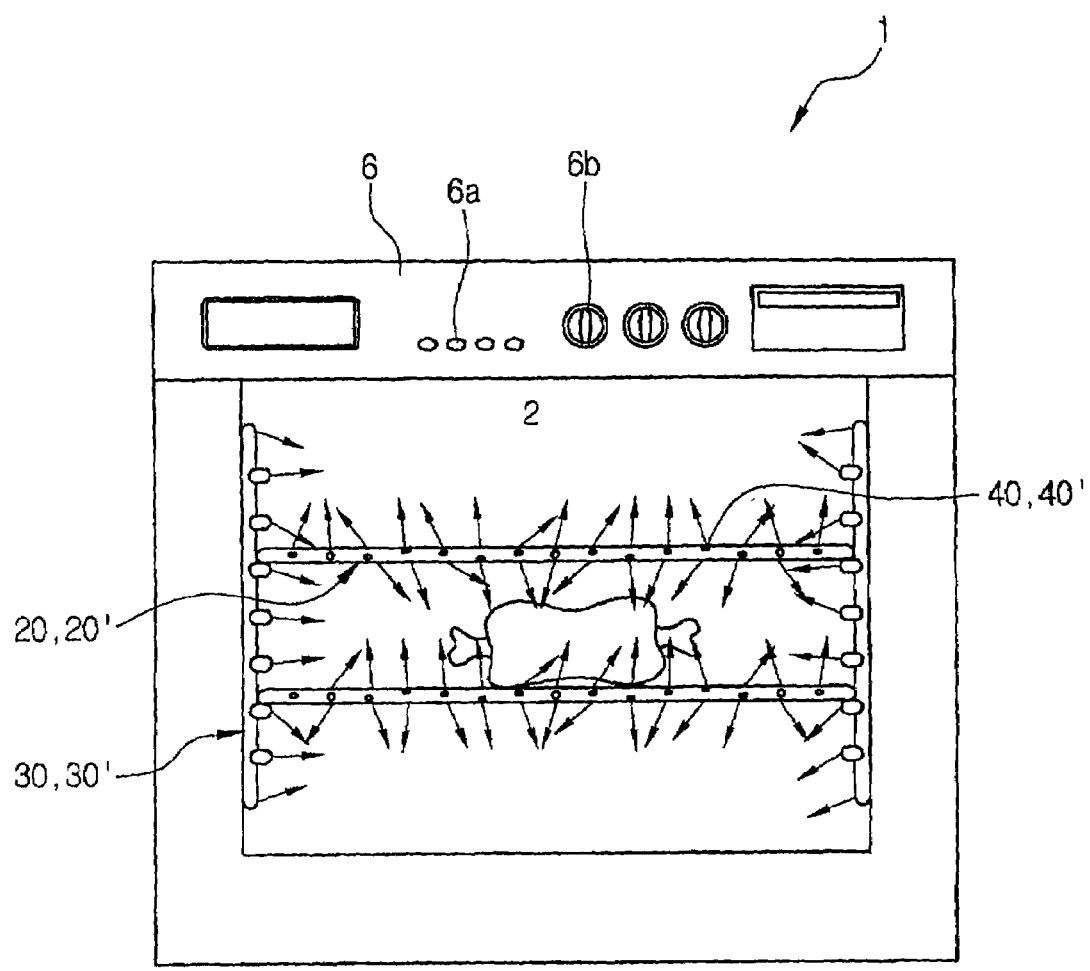
FIG. 6 is a front view of a heating cooker, according to the present invention, to show a structure to discharge steam into a cooking cavity of the heating cooker.

In the heating cooker according to the present invention, the steam supplied by the steam generator 10 is distributed through all portions of the food racks 20, 20' and the rack supports 30, 30' which are installed in the cooking cavity 2 to allow the steam to be evenly discharged into the cooking cavity 2. Further, as shown in FIG. 6, the heating cooker includes the plurality of steam discharging holes 40, 40' so that the steam is distributed through the food racks 20, 20' and the rack supports 30, 30' in all directions to allow the steam to be efficiently transmitted to the entire surface of food.

The operation and operational effects of the heating cooker according to the present invention will be described in the following in detail.

When food is placed on each of the food racks 20, 20' and the control buttons 6a and the control knobs 6b provided on the control panel 6 are manipulated, the heater 7 and the steam generator 10 are separately or simultaneously operated. At this time, either heat generated by the heater 7 or the steam generated by the steam generator 10 is transmitted to the food to be cooked, or both heat generated by the heater 7 and the steam generated by the steam generator 10 are transmitted to the food to be cooked. In this case, the steam supplied from the steam generator 10 to the food racks 20, 20' and the rack supports 30, 30' is evenly discharged into the cooking cavity 2 through the plurality of steam discharging holes 40, 40' provided on the food racks 20, 20' and the rack supports 30, 30' while being transmitted to the food. The generation and flow of the steam will be described in the following in detail.

After water is supplied to the lower portion of the steam generator 13 through the feed pipe 16, the first and second heating members 11 and 12 are heated. When the first heating member 11 immersed in water is heated, steam is generated. The steam flows upward, and then is heated again by the second heating member 12. Thereafter, the steam flows to the outlet 14 of the steam generator 10, and subsequently is transmitted to the steam supply pipe 15. The steam transmitted to the steam supply pipe 15 is supplied to each of the food racks 20, 20' and each of the rack supports 30, 30' through the steam injection pipe 50, 50'. As shown in FIG. 6, the steam fed into the food racks 20, 20' and the rack supports 30, 30' is evenly discharged into the cooking cavity 2 through the steam discharging holes 40, 40' provided on the food racks 20, 20' and the rack supports 30, 30'. Further, the plurality of steam discharging holes 40, 40' have the plurality of steam discharging holes 40, 40' with different steam discharging directions to allow the steam to be distributed in all directions. Thereby, the steam distributed through the food racks 20, 20' and the rack supports 30, 30' is efficiently transmitted to the entire surface of the food.

As is apparent from the above description, the present invention provides a heating cooker, which is constructed so that steam generated by a steam generator is distributed through food racks and rack supports installed in a cooking cavity, to allow the steam to be evenly discharged into the cooking cavity. Further, a plurality of steam discharging holes are provided on the food racks and the rack supports, to allow the steam to be distributed in all directions, and thereby allow the steam to be supplied to an entire surface of food through the food racks and the rack supports, and allow the steam to be efficiently transmitted to the food.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A heating cooker, comprising:
   a cooking cavity;
   a steam generator to supply steam into the cooking cavity; and
   a food rack installed in the cooking cavity to support food thereon, including a pipe to supply the steam from the steam generator to the cooking cavity, and a plurality of steam discharging holes to discharge the steam into the cooking cavity.

2. The heating cooker according to claim 1, wherein the food rack is substantially entirely fabricated with the pipe.

3. The heating cooker according to claim 2, wherein the food rack comprises a plurality of food racks in a multi-level structure.

4. The heating cooker according to claim 3, wherein the plurality of food racks communicate with each other to form a single steam passage.

5. The heating cooker according to claim 3, wherein each of the plurality of food racks forms an independent steam passage.

6. The heating cooker according to claim 5, further comprising:
   an outlet of the steam generator; and
   a plurality of branch pipes, connected to the outlet of the steam generator, the plurality of branch pipes being respectively coupled to each of the plurality of food racks.

7. The heating cooker according to claim 5, wherein each of the plurality of food racks has an adjustable vertical position.

8. The heating cooker according to claim 1, wherein the plurality of steam discharging holes discharge steam in different steam discharging directions.

9. The heating cooker according to claim 1, further comprising a heater to irradiate heat into the cooking cavity.

10. The heating cooker according to claim 1, wherein the steam generator is an overheated steam generator.

11. A heating cooker, comprising:
a cooking cavity;
a steam generator to supply steam into the cooking cavity;
a food rack installed in the cooking cavity to support food thereon; and
a rack support provided on an inner wall of the cooking cavity to support the food rack, wherein the food rack and the rack support respectively include a pipe to supply the steam from the steam generator into the cooking cavity, and a plurality of steam discharging holes to discharge steam into the cooking cavity.

12. The heating cooker according to claim 11, wherein the food rack and the rack support are respectively substantially entirely fabricated with the pipe.

13. The heating cooker according to claim 12, wherein the food rack and the rack support communicate with each other to form a single steam passage.

14. The heating cooker according to claim 12, wherein the food rack and the rack support form independent steam passages.

15. The heating cooker according to claim 14, further comprising:
an outlet of the steam generator;
a plurality of branch pipes connected to the outlet of the steam generator, including a first branch pipe coupled to the food rack, and a second branch pipe coupled to the rack support unit.

16. The heating cooker according to claim 15, wherein the food rack comprises a plurality of food racks to provide a multi-level structure, and communicate with each other to form a single steam passage.

17. The heating cooker according to claim 15, wherein the food rack comprises a plurality of food racks to provide a multi-level structure, to form independent steam passages, and
the first branch pipe comprises a plurality of first branch pipes to be respectively coupled to each of the food racks.

18. The heating cooker according to claim 15, wherein the rack support comprises a plurality of rack supports to communicate with each other to form a single steam passage.

19. The heating cooker according to claim 15, wherein the rack comprises a plurality of rack supports, each forming an independent steam passage, and
the second branch pipe comprises a plurality of second branch pipes to be respectively coupled to each of the rack support units.

20. The heating cooker according to claim 17, wherein each of the plurality of food racks has an adjustable vertical position thereof.

21. The heating cooker according to claim 11, wherein the plurality of steam discharging holes discharge steam in different steam discharging directions.

22. The heating cooker according to claim 11, further comprising a heater to irradiate heat into the cooking cavity.

23. The heating cooker according to claim 11, wherein the steam generator is an overheated steam generator.

24. The heating cooker according to claim 11, wherein the rack support comprises:
a left rack support to which a left side of the food rack is mounted; and
a right rack support to which a right side of the food rack is mounted, wherein the left and right rack supports communicate with each other via the food rack.

25. The heating cooker according to claim 11, wherein the rack support comprises:
a left rack support to which a left side of the food rack is mounted; and
a right rack support to which a right side of the food rack is mounted, wherein the left and right rack support, and the food rack form steam passages which are independent from each other.

26. The heating cooker according to claim 11, further comprising a steam supply pipe to branch into first and second branch pipes, wherein the first branch pipe connects to the food rack and the second branch pipe connects to at least one of the left and right rack supports.

27. The heating cooker according to claim 11, wherein the food rack comprises a plurality of food racks in a multi-level structure in which each of the food racks forms an independent steam passage, and
the left and right rack supports support the plurality food racks to have adjustable vertical positions.

28. The heating cooker according to claim 27, further comprising:
first steam injection pipes to supply steam to the plurality of food racks; and
second steam injection pipes to supply steam to the left and right rack supports.

29. The heating cooker according to claim 28, wherein the food racks are separated from the left and right rack supports.

* * * * *

UNITED STATES PATENT AND TRADEMARK OFFICE
CERTIFICATE OF CORRECTION

PATENT NO. : 6,930,286 B2  Page 1 of 1
DATED : August 16, 2005
INVENTOR(S) : Jong Gun Kim It is certified that error appears in the above-identified patent and that said Letters Patent is hereby corrected as shown below:

<u>Column 10,</u>
Line 37, after "plurality" insert -- of --.

Signed and Sealed this

Twenty-third Day of May, 2006

JON W. DUDAS
*Director of the United States Patent and Trademark Office*